US006793896B1

(12) United States Patent
Swars

(10) Patent No.: US 6,793,896 B1
(45) Date of Patent: Sep. 21, 2004

(54) HONEYCOMB

(76) Inventor: Helmut Swars, Riedweg 11, 51429 Bergisch Gladbach (DE)

(*) Notice: Subject to any disclaimer, the term of this patent is extended or adjusted under 35 U.S.C. 154(b) by 0 days.

(21) Appl. No.: 09/571,725

(22) Filed: May 15, 2000

(30) Foreign Application Priority Data

May 14, 1999 (DE) .......................................... 199 22 356

(51) Int. Cl.$^7$ ............................ B01J 35/04; F01N 3/28; B01D 53/34
(52) U.S. Cl. ....................... 422/180; 422/177; 422/211; 422/222; 502/439; 502/527.19; 428/593
(58) Field of Search ................................ 422/171, 177, 422/180, 211, 222; 428/116, 593; 502/527.19, 527.22, 439

(56) References Cited

U.S. PATENT DOCUMENTS

| | | | | |
|---|---|---|---|---|
| 4,383,974 A | * | 5/1983 | Fratzer et al. .............. | 422/176 |
| 5,055,275 A | * | 10/1991 | Kanniainen et al. ........ | 422/180 |
| 5,177,960 A | | 1/1993 | Hitachi et al. .............. | 422/180 |
| 5,330,728 A | | 7/1994 | Foster ........................ | 422/177 |
| 5,411,711 A | * | 5/1995 | Swars ........................ | 422/177 |
| 5,460,790 A | | 10/1995 | Shustorovich et al. ...... | 422/177 |
| 5,512,250 A | * | 4/1996 | Betta et al. ................. | 422/173 |
| 5,593,645 A | | 1/1997 | Steenackers et al. ........ | 422/181 |
| 5,948,504 A | * | 9/1999 | Swars et al. ................ | 428/116 |
| 6,187,274 B1 | * | 2/2001 | Nilsson ...................... | 422/180 |
| 6,190,784 B1 | * | 2/2001 | Maus et al. ................. | 428/593 |
| 6,287,524 B1 | * | 9/2001 | Hums et al. ................ | 422/180 |
| 6,537,681 B1 | * | 3/2003 | Swars ........................ | 428/593 |
| 6,589,910 B1 | * | 7/2003 | Swars ........................ | 502/439 |

FOREIGN PATENT DOCUMENTS

| | | |
|---|---|---|
| DE | 44 35 913 | 4/1996 |
| DE | 195 30 850 | 2/1997 |
| DE | 196 47 400 | 5/1998 |
| DE | 197 12 154 | 9/1998 |
| DE | 297 23 721 | 3/1999 |
| DE | 198 16 482 | * 10/1999 |
| EP | 0 870 909 | 10/1998 |
| EP | 0 887 521 | 12/1998 |
| GB | 2 174 615 | 11/1986 |
| WO | WO 97/45200 | * 12/1997 |

OTHER PUBLICATIONS

Patent Abstracts of Japan, Publication No. 0829088, Publication Date Feb. 2, 1998.

* cited by examiner

Primary Examiner—Hien Tran
(74) Attorney, Agent, or Firm—Browdy and Neimark, P.L.L.C.

(57) ABSTRACT

The invention relates to a honeycomb (14), particularly a catalytic converter substrate, with a honeycomb structure comprising a large number of ducts (16) running in the longitudinal direction of the honeycomb, through which a fluid can flow, where the honeycomb possesses foil layers (15) arranged one above the other. In order to create a honeycomb permitting high efficiency of the catalytic conversion reactions with low thermal inertia, as well as inexpensive manufacture, it is proposed to provide ducts (16) whose cross-sectional dimension in a first direction is several times the cross-sectional dimension in another direction. In particular, the ducts can extend over the entire width of the honeycomb. In order to stabilise the honeycomb, stiffening elements (19, 20) can be provided, which are either integrated in the foil layers or separate (FIG. 3).

7 Claims, 12 Drawing Sheets

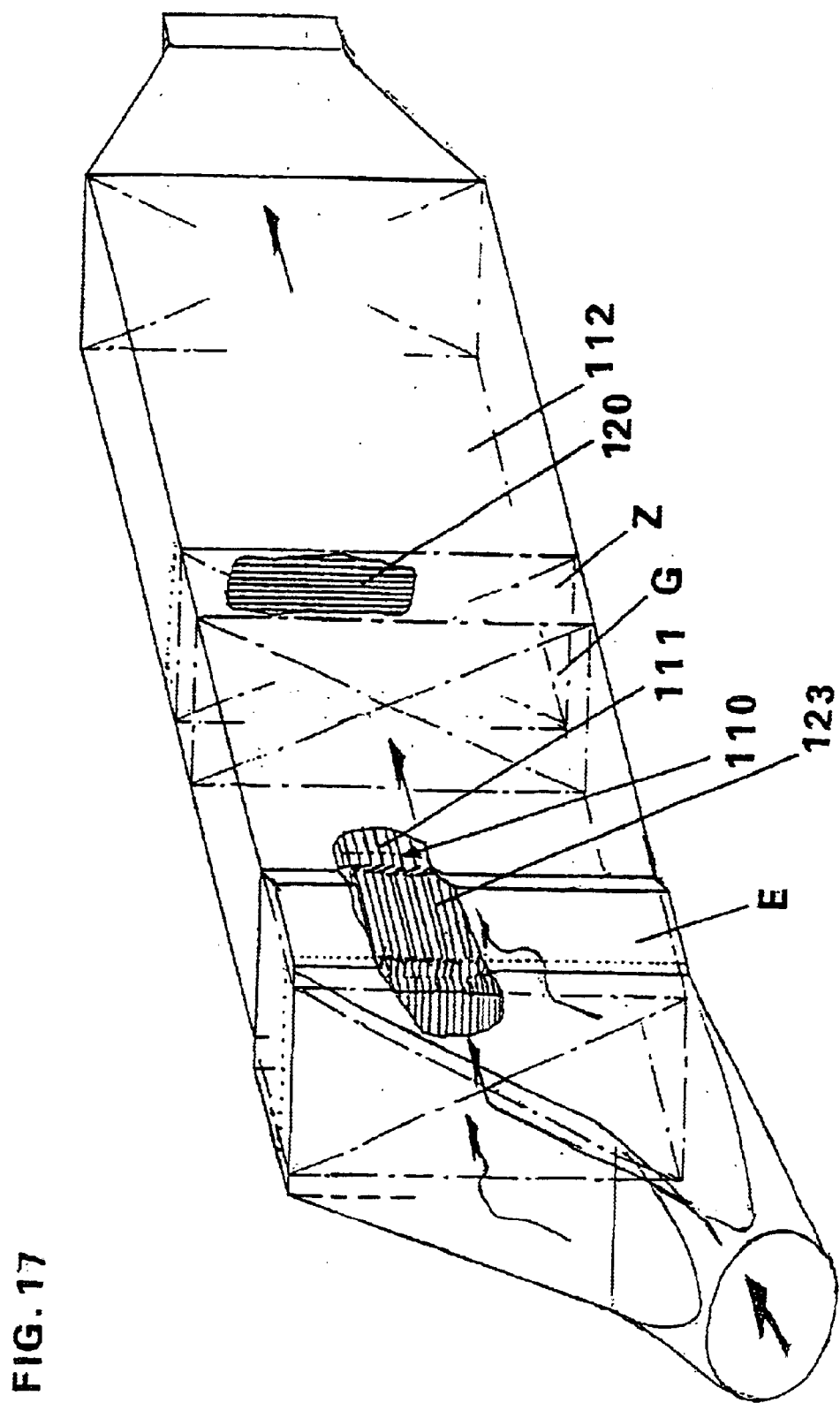

HONEYCOMB

FIELD OF THE INVENTION

The invention relates to a honeycomb, particularly as a catalytic converter substrate, with a honeycomb structure comprising a large number of ducts running in the longitudinal direction of the honeycomb, through which a fluid can flow, where the honeycomb possesses foil layers arranged one above the other.

BACKGROUND OF THE INVENTION

Honeycombs of this type are particularly used as exhaust gas catalytic converters in motor vehicles, although they can also be used in other combustion installations or in chemical engineering, if appropriately dimensioned.

Honeycombs of this kind are known which possess an alternating arrangement of plane and corrugated foils soldered to each other, thus producing fairly small ducts with a cross-section that is essentially sinusoidal or encloses an incircle. In order to achieve the most complete possible catalytic conversion in the honeycomb, the honeycomb must have an appropriate volume to ensure that the retention time of the substances to be converted in the honeycomb is sufficiently long. However, the surface area of the duct walls contained in the honeycomb volume is an essential determinant of the costs, as it causes a corresponding increase in the use of structural material and catalytically active coating material, which usually contains precious metals, such as platinum, palladium and/or rhodium. The increase in substrate mass, as well as in binder and carrier material for the catalytically active precious metals, also increases the thermal inertia of the catalytic converter, as a result of which, for example, the pollutant emission of exhaust gas catalytic converters is elevated during the warm-up phase of vehicle engines. Moreover, an increase in the internal surface area also increases the pressure loss in these and thus the power loss of the drive unit.

The object of the invention is to create a honeycomb that permits highly effective catalytic conversion with low thermal inertia, as well as the inexpensive manufacture of catalytic converters.

SUMMARY OF THE INVENTION

According to the invention, the object is solved in that ducts are provided, whose cross-sectional dimension in a first direction is several times the cross-sectional dimension in another direction, particularly a direction perpendicular to the first it has been found that ducts of this kind display a far more effective duct geometry that sinusoidal ducts, for example, in which the gussets or acute-angled inside corners of the ducts have virtually no catalytic effect, despite being coated with catalytically effective material. The efficiency is also improved in comparison with ducts with an approximately circular or isogonal duct cross-section, because the elongated or gap-like duct cross-sections permit better mass transfer transverse to the flow ducts owing to a more favourable ratio of cross-section to wall circumferential area, this being favourable in the case of laminar flow, in particular. Due to the elongated, non-isogonal cross-sections of the ducts, where the duct walls are at very different distances from the centre of the duct, the volume percentage with stagnating or only slow-flowing gas boundary layers, and thus the inhibition of diffusive transport of the pollutants to the catalytically active coatings, is reduced, and the area-specific reactivity, and thus the efficiency of the resultant catalytic converter, is substantially increased. Moreover, savings can be made on substrate and coating material.

The ducts can display a straight, curved or kinked, parallel profile.

The non-isogonal or non-isometric ducts according to the invention preferably account for a volume percentage of the honeycomb that constitutes a non-negligible proportion of the total capacity of the catalytic converter, e.g. more than 5% of the total catalytic converter capacity, particularly preferably almost the total catalytic converter capacity. The honeycomb area designed in accordance with the invention can thus, for example, account for more than 10 percent by volume and preferably more than 25 or 50 percent by volume of the total honeycomb volume.

The areas of the honeycomb designed according to the invention are preferably at a distance from its marginal areas, i.e. its face and/or lateral surfaces. The distance from the marginal areas can be several times the duct height, e.g. more than 5 or 10 times, or a fraction of the honeycomb width, e.g. $\frac{1}{20}$ to $\frac{1}{10}$ or more. Advantageously, the entire honeycomb structure is composed of non-isogonal ducts according to the invention, where different areas of the honeycomb can, however, display different duct cross-sections.

In order to improve the efficiency of the catalytic converter, the non-isogonal ducts can extend over a substantial portion of the length of the honeycomb, e.g. more than one-quarter or one-half of the same, preferably over virtually the entire length of the same, where the ducts can be interrupted by areas having different cross-sectional geometries. However, it could be sufficient that the ducts having non-isogonal cross-sections or having a substantially constant heigt over a width of several foil layer distances do extend with their cross-sections as defined above over a length corresponding to several foil layer distances.

The ducts advantageously extend over the entire width of the honeycomb, as a result of which temperature equalisation is not impeded by partition walls and mass transfer is possible over the entire width of the honeycomb, this leading to a more uniform distribution of both velocity and mass over the cross-section of the honeycomb. The retention time of the fluid in the honeycomb, which defines the lower limit of the honeycomb volume, is equalised and increased as a result, thus also increasing the efficiency.

In particular, the ducts can have at least locally or over a portion or preferably over the entire length of the honeycomb a height being at least substantially constant, the ducts extending with this height over a width of the honeycomb of a length corresponding to a multiple (for instance the 2 or 3-to 5-fold or even more) of the average or the greatest height of the ducts or the foil layer distance. Duct walls or duct sections having smaller cross sections can be adjacent these duct sections. Adjacent foil layers therefore extend at least over this width or over a larger width, for instance $\frac{1}{10}$ or $\frac{1}{2}$ or over the entire width of the honeycomb substantially in parallel to each other. Accordingly substantially no or only small cross sections lowerings, for instance being about 25% or less of the duct height, are present over this width.

The ducts can, in particular, be designed in such a way that they extend with at least an approximately equal height over a width corresponding to a multiple (e.g. 3 to 5 times or more) of the mean of maximum duct height. These areas can be followed by duct walls or duct constructions.

In particular, the foil layers have a profile, the profile height of which is small in comparison with the distance between opposite foil layers. This profile can be provided, for example, in the form of punctiform elevations and depressions, these increasing the stiffness of the foil layers and simultaneously improving the adhesion of a ceramic substrate material on the foil layers.

In addition, or as an alternative, the foils can also be provided with a profile, the profile height of which, i.e. the distance between the upper and lower vertex of the profile, is large compared to the distance between the foil layers. In addition to stabilising the dimensions of the foils, this can also influence the flow characteristics of the honeycomb, e.g. in relation to a mass transfer in the transverse direction of the same.

For special applications, e.g. with partial lateral inflow into the ducts, it may be desirable to provide a profile which is of asymmetrical design in relation to a reference plane running through one vertex of the profile, perpendicular to the foil layer. The flow resistance in opposite directions transverse to the profile is different as a result, meaning that the honeycomb acts as a kind of flow diode for the transverse component of the flow in the ducts. To this end, the foil layers can, for example, be folded in zigzag fashion, the adjacent limbs of the fold having different lengths and slopes.

The honeycomb according to the invention can, in particular, be made up of foil layers with identical profiles that are arranged in congruent fashion relative to each other. Honeycombs with curved or bent, gap-like ducts can be constructed particularly easily in this way. Given a suitable profile, however, the foil layers with identical profiles can also be arranged inversely in relation to each other and also display different duct widths in the course of the duct.

Profiling can be achieved in a wide variety of ways, regardless of the profile height. The foil layers can be provided with profiles that extend in the longitudinal direction or transverse to the longitudinal direction of the flow ducts and are designed in the form of ribs or webs. The profiling can extend over the entire length or width of the honeycomb or the width of the flow ducts, or only over part of the same.

In particular, the profile can be designed in such a way that the smallest distance of the foil layers from each other remains virtually unchanged or is not significantly reduced, so that the flow resistance through the honeycomb is not increased. The profile can, in particular, be realised by folding the foils, so that the honeycombs are easily manufactured while displaying great stability. The slope of the profiled areas in the longitudinal direction of the ducts, in particular, can be small compared to the distance between foils, this keeping the pressure losses low.

The honeycomb structure can, in particular, be designed in such a way that the Nusselt number, referred for comparison to a specific mass flow, such as is typical for automotive applications, for example, is >4.5, preferably >6 for an area of the honeycomb of >10 percent by volume, preferably >25%, particularly preferably >50%. In these relations, the values given refer to a diffusion distance of 0.5 mm, which corresponds to the radius in the case of flow ducts with circular cross-section, for example. In particular, Nusselt numbers of 15 can readily be achieved with ducts of large cross-section with carrier profiles for catalytically active material running parallel to the direction of flow and permitting flow around their full circumference, which can have edges around which flow is possible. In particular, the honeycomb can be designed in such a way that a mean Nusselt number of >4.5, preferably >6 results for it. For comparison, it can be mentioned that the Nusselt number for gap-like ducts extending over the width of the honeycomb is approximately 8.

The cross-sections of the ducts designed according to the invention can be arranged in such a way that they extend over cross-sectional areas of the honeycomb in which temperature differences of more than 10° C., preferably more than 50° C. exist during the start-up phase of catalytic converter operation. In particular, starting from the outer sides of the honeycomb, which are the coldest during the start-up phase, the ducts can extend over 25%, preferably over half of the honeycomb cross-section towards the centre axis or plane of the same. Catalytic converter carrier elements with edges around which flow is possible, particularly carrier elements permitting flow around their full circumference, can be provided in these areas.

Owing to the great width of the flow ducts, the catalyst coating can be thicker than in conventional honeycombs. For instance, with a foil thickness of approximately $5/100$ mm, the coating thickness can be 5 to $25/100$ mm or more, corresponding to a ratio of coating thickness to foil thickness of 1 to 5 or more. The ratio can also be >10 for special applications. This substantially reduces the sensitivity of the catalyst to catalyst poisons.

In order to increase the dimensional stability of the ducts and the resistance of the honeycomb to thermal shocks, the foil layers can be provided with stiffening elements, the advantageous design of which is described further below and which are preferably provided in or adjacent to the areas of the honeycomb having duct sections with non-isogonal cross-sections. The stiffening elements can be integrated in the foil layers, e.g. in the form of profiles extending in and/or transverse to the longitudinal direction of the flow ducts, and can, for example, be designed as meandering foil layer folds with contacting fold webs. It is also possible to insert additional, separate stiffening elements into the honeycomb which, for example, support relatively large duct wall areas and can act on the duct wall surfaces in punctiform or linear fashion for this purpose. The stiffening elements, e.g. in the form of wire pins, can be offset relative to each other in the supporting areas formed by them, which can be designed as planes, in such a way that they result in little or virtually no constriction of the duct cross-sections and generate no major vortex zones when the fluid flows around them. The stiffening elements can also be interconnected. Regardless of the design of the stiffening elements, they can be distributed in the honeycomb in organised fashion, e.g. in preferred directions or planes of the honeycomb or in symmetrical patterns, or they can also be distributed randomly. Honeycomb areas with accumulations of stiffening elements can alternate with areas with few or no stiffening-elements, this making it possible to produce zones with different mechanical properties, such as elevated stiffness. The zones can be located within the honeycomb or in its peripheral areas and can alternate in the axial and/or radial direction with unstiffened areas of high extensibility. In this context, the dimensions of the stiffening zones transverse to the flow ducts is advantageously a multiple of the distance between foils. To obtain a zoned structure of the honeycomb, the stiffening elements integrated in the foil layers can similarly also display zones of different stiffness or have an appropriately dimensioned length. The stiffening elements can be provided in the interior of the honeycomb and/or in the area of the face and lateral surfaces of the honeycomb. The stiffening elements are preferably arranged in each case such that they cover none, or only small surface areas, of the duct walls.

The stiffening elements can be arranged in such a way that relatively large self-supporting foil areas result as duct walls, where the distance between supports, i.e. the distance between the points of contact of the stiffening elements on the foil layers, is a multiple of the shorter cross-sectional dimension of the ducts or up to the maximum distance at which sufficient stability is still ensured under the operating conditions of the honeycomb. The points of support can be arranged in punctiform or linear fashion or in planes.

The stiffening elements, which can be arranged in aligned supporting planes or lines, as well as at spatially offset, non-aligned points, are preferably arranged in such a way that a fluid can flow around them without any reduction of the cross-section.

In order to stiffen the honeycomb structure resulting from the build-up of the foil layers, e.g. from the laying of foil strips in meandering fashion, isolated, one-dimensional joints can be provided which connect the individual foil layers, which can be profiled or unprofiled, to each other or to further stiffening elements and which are specifically inserted into the honeycomb for this purpose. The joints can, at least in certain directions in space, particularly display greater strength and load-bearing capacity than soldered joints and, in particular, be produced by positive, non-positive and/or material connections, such as by notched tabs or webs which can be fixed in adjacent foil folds, at least in one direction, or fed through apertures, by beading or twisting cut foil sections or, for example, by spot welding methods. The joints can be arranged in preferred directions or planes of the honeycomb or in symmetrical patterns, but they can also be distributed randomly. In given directions, the joints can be provided at every point of contact between adjacent foil layers, or only at every second, third point of contact, etc. The described stiffening of the honeycomb by means of isolated joints can be applied not only to honeycombs with non-isogonal duct cross-sections, but also to those with conventional, isometric (e.g. hexagonal or sinusoidal) duct cross-sections.

The honeycomb is advantageously provided with stiffening elements which run transverse to the flow ducts, this preventing excessive changes in the distance between foil layers being brought about by bending induced by temperature fluctuations. In this context, the stiffening elements can, for example, be designed as wires, strips or layers of expanded metal, or as folds in the foil layers. The stiffening elements can support the foil layers or penetrate them, in which case they can be connected to the foil layers in a manner capable of withstanding tensile forces or passed through them loosely.

Given a suitable profile height of the foil layers, the stiffening elements oriented parallel to the foil layers can also act on several foil layers arranged one above the other.

As an alternative, or in addition, stiffening elements can be provided which are arranged perpendicular to the foil layers and penetrate several foil layers arranged one above the other. These stiffening elements can, for example, have the form of wires or strips, or of wall areas made up of foil folds.

If the foil layers are profiled, additional stiffening elements are advantageously provided that are a long distance apart, e.g. a multiple of the duct height, and that can be of separate design. They are particularly located at those points where the forces acting on the foil layers are more intense, such as in the inlet and/or outlet areas. The additional stiffening elements can be connected to each other and/or to the housing in force-dissipating fashion and, in this context, form planes or lines of increased stiffness, which can be some distance apart in the longitudinal direction of the honeycomb. The stiffening elements can alternatively or additionally also be located in the foil profiles and optionally fastened to these, e.g. in foil profiles in the form of web-like layer folds. The stiffening elements can also be provided in the area of outside and/or partition walls or partial walls of the honeycomb and, in particular, connected to these in force-dissipating fashion. The stiffening elements can be of one-dimensional design in each case, e.g. in the form of wires, pins, strips or foil folds, but they can also be designed as extended-metal layers or the like, or also as joints between foil layers or sections.

In this context, the stiffening elements can be fastened to the foil layers by non-positive, positive or material connections, e.g. trapped in foil folds, which can also be formed by notched tabs, or twisted in order to form a positive connection. Adequate fastening may, under certain circumstances, already be obtained by coating the prefabricated honeycomb, e.g. with the ceramic compound that carries the catalyst.

Advantageously, the width of the respective stiffening elements is small compared to the length of the flow ducts, so that the catalytically active duct walls are only marginally covered by the stiffening elements and the flow characteristics of the honeycomb remain virtually unaffected. Thus, the necessary width of the stiffening elements, which in each case depends on the given profiling of the foil layers, among other things, can be $1/5$ or $1/10$ to $1/100$ of the length of the flow ducts, without being limited to these values.

In each case, the stiffening elements preferably extend over a length corresponding to several times the distance between foil layers, particularly preferably over the full extent of the cross-section of the honeycomb.

In order to stabilise the foil layers and enlarge the area-specific conversion coefficient on the catalytically active surface, the foil layers can be provided with longitudinal ribs which run parallel to the flow ducts and extend over a part or the whole of the length of the flow ducts. In this context, the height of the longitudinal ribs is preferably small compared to the height of the ducts, e.g. equal to half the duct height or less, so that the local increase in turbulence is not cancelled out again by an increase in thicker boundary layers.

Foil folds with a height greater than the distance between foil layers can also be provided for stiffening, the individual fold webs being fastened to each other. To this end, the fold webs can be directly fastened to each other in non-positive and/or positive fashion; other stiffening elements can also serve this purpose, e.g. in the form of wires or strips running perpendicular and/or parallel to the foil layers.

In order to stiffen the honeycomb structure released or disengaged foil layer sections can be provided supporting adjacent foil layers.

All in all, regardless of the specific configuration, different stiffening elements can be fastened to each other, as a result of which two or three-dimensional systems of stiffening elements can arise.

The stiffening elements can, in particular, be connected to the housing or to partition or outside walls of the honeycomb in tension-absorbing fashion. In this context, the partition and outside walls can be of rigid or elastically deformable design, e.g. in the form of fold webs of the foil layers connected to each other.

Furthermore, the foil layers can be provided with notched tabs which serve to support the foil layers against each other and to permit gas exchange between adjacent ducts or to enlarge the surface area of the catalyst. The notched tabs are advantageously designed in the form of webs running in the longitudinal direction of the ducts.

According to another configuration, flow deflectors can be provided in the region of the flow ducts. e.g. within or at the face ends of the same, due to which flowing fluid volumes automatically continue with a lateral and/or vertical offset, which can also be advantageous with honeycombs not designed according to the invention, e.g. with isometric duct cross-sections. As a result, the length of the flow paths can exceed the length of the honeycomb, for instance by 5 to 20% or more. The offset in each case can, for example, be one-quarter to one duct height, i.e. the extent of the smaller cross-sectional dimension, or more. In particular, the flow deflectors can be designed in such a way that they automatically mix the fluid passing through one duct section with partial volumes of the fluid passing through adjacent duct sections, with which there was little or no mass transfer. These adjacent duct sections can be separated by constrictions, areas of lateral deflection, such as foil layer folds, duct walls or as a result of a large duct width which exceeds the lateral diffusion path in the retention time of the fluid in the duct section, with the result that diffusive mass transfer virtually no longer takes place. The flow deflectors can, for example, be realised by an appropriate design of the duct walls, e.g. with areas running at an angle to the direction of flow, by additional deflection devices, such as baffle plates with deflecting bevels at an angle to the direction of flow in and/or at the face ends of the ducts, and/or by laterally offsetting consecutive sections of the honeycomb with partition walls which divide media volumes guided upstream in a common flow duct as a result of the offset of the partition walls and combine separated volumes in a flow duct upstream. The deflecting bevels, regardless of their design, advantageously lie flat and at an acute angle of less than 45 to 30°, preferably less than 10°, to the direction of flow, and can also be of curved design. The flow deflectors are advantageously designed in such a way that they essentially do not reduce the size of the duct cross-sections over a section of the honeycomb and thus do not increase the flow resistance of the honeycomb at all, or only slightly. To this end, the offset of one fluid volume can be coupled with the offset of an adjacent volume element in another direction, e.g. the opposite direction, where the overall cross-section can remain approximately unchanged over the length of the deflection area. To this end, the duct cross sections can, for example, simultaneously vary in both height and width over the length of the duct while retaining a constant cross-sectional size. At the position of the deflectors, the flow of ducts or duct areas adjacent to each other in the direction of offset of the fluid volumes can be coupled, thereby permitting an exchange of fluid. The deflectors can, in particular, act as flow dividers, e.g. by means of adjacent bevels with opposite inclinations, so that a volume flow is divided and deflected in different directions.

At the inlet and/or outlet areas of the honeycomb, the foil layers can display areas which are inclined relative to the principal plane of the foil layers. These areas can, for example, be integrally moulded on the foil layers or on profiles that are to be inserted into the honeycombs at the face end and permit flow around or through themselves. The scoop-like effect of these areas improves the inflow behaviour in the event of inclined inflow into the honeycomb. Furthermore, the inlet or outlet area of the honeycomb can be stiffened by means of additional stiffening elements or foil layer folds, this avoiding pressure losses resulting from undesirable movements or non-uniform changes in the distance between foil layers. In particular, this also applies to the inlet and outlet areas of scoop-like design.

In the event of angled flow of the fluid in relation to the longitudinal axis of the honeycomb, it has proven particularly favourable to design the inlet and/or outlet area of the honeycomb according to the invention in such a way that the inflow direction is parallel, or at an angle of less than 90°, to the plane of the foil layers. This particularly applies to gap-like ducts that extend over a major part of the width, or over the entire width, of the honeycomb.

According to a particularly advantageous configuration, the sides of the ducts are open towards the outside of the honeycomb in the inlet area of the honeycomb, so that the fluid can flow into the space between the foil layers in a direction transverse to the longitudinal direction of the flow ducts over part of the length of the ducts. This preceding enlarged inlet area around the face end of the honeycomb, which can be realised, for example, by leaving a lateral gap between the inlet pipe and the foil layers, makes it possible to set a more uniform, and thus lower, flow velocity in the inlet area of the honeycomb, which leads to a longer retention time of the fluid here and to less stress from mechanical vibrations, while also reducing the thermal stress on the honeycomb by distributing it over a larger area. As a result, particularly effective catalytic use is made of the inlet area of the honeycomb, the volume of the catalytic converter can be reduced and the honeycomb can be charged with hotter media with less risk of hot-spots. As a result, the catalytic converter can, for example, be installed closer to the engine in motor vehicles, making it possible to shorten the cold-start phase with low catalytic converter activity. The outer edge of the face-end plane and of the honeycomb is heated more intensively, more uniformly and deeper into the honeycomb as a result, thus substantially increasing the efficiency as a whole. This design can also be realised regardless of whether the honeycomb structure has ducts according to the invention.

It follows from the above that it is also easily possible for several honeycombs to be arranged one behind the other and for these to display different duct geometries or to be rotated about their longitudinal axes relative to each other, this permitting further homogenisation of the medium flowing through the honeycomb. Moreover, it is also possible for honeycomb areas designed according to the invention to alternate, in the longitudinal and/or transverse direction of a honeycomb, with others of a different design, e.g. with a different, possibly conventional, duct structure or with an open substrate structure permitting virtually unobstructed fluid exchange transverse to the direction of .flow over substantial areas of the substrate. The duct walls, which prevent fluid exchange transverse to the direction of flow and separate partial fluid flows from each other, can also be provided with apertures, through which a lateral fluid exchange is possible and which can extend over the greatest possible length of the honeycomb, e.g. over more than 15 or 25%, up to virtually the entire length of the honeycomb.

A particularly advantageous design of a honeycomb is one where several mixing zones (including the inlet and outlet zones), where mixing primarily takes place, alternate with several reaction zones, where the reaction primarily takes place. The honeycomb thus preferably displays at least two or more, for example ten or more, reaction zones separated by mixing zones. In this context, the honeycomb can also be assembled from several individual elements, each of which engages the front ends of an adjacent honeycomb, thus forming a continuous reaction and flow chamber. The ratio of the sum of the lengths of the reaction zones to the sum of the lengths of the mixing zones is >2, preferably 5 to 20 or more. In this context, the length of the comparatively short mixing zones can be 2 to 20 times the gap width or height of the flow ducts. The mixing zone and the inlet zone are characterised in that vortices are produced in them and that the flow resistance is thus essentially determined by the form resistance and extensive deflection of the flow paths exists as a result of obstacles to flow. To this end, the flow cross-section can, for example, be provided with profiles running at an angle to the direction of flow, such as webs of expanded-metal layers, inlet profiles, wires or the like, the surfaces of which against the medium flows running at an angle of >15°, preferably 45 to 90°, relative to the direction of flow. However, both with angled inflow into the honeycomb and with inflow in the longitudinal direction of the same, a high form resistance is also generated by the duct structure of the honeycomb in the inlet area owing to the abrupt transition from turbulent to laminar flow and the vortices developing as a result, without having to provide flow-deflecting baffle plates or the like for this purpose. In contrast, the reaction zones are characterised by a high frictional force component in the flow resistance, the result being that micro-turbulence zones are present here. In these zones, the carrier elements preferably run parallel to the longitudinal direction of flow, or at an angle of up to approximately 10°.

Taken as a whole, the ratio of the form resistances of the mixing zone to the frictional resistances of the reaction zone can be 2.5 or more, i.e. the pressure loss in the mixing zone referred to a unit length is 2.5 or more times the pressure loss under the flow conditions prevailing in the reaction zone. As a result, a honeycomb with several zones having markedly different functions is created, where strong transverse mixing takes place in the mixing zones as a result of accelerated flows and vortex formation and where more micro-vortices or shear vortices occur in the reaction zones as a result of static friction.

BRIEF DESCRIPTION OF THE DRAWINGS

FIG. 17 is a schematic representation of a honeycomb constructed of foil layers at a distance from each other.

An example of the invention is described below and explained on the basis of the figures.

Figure 1:
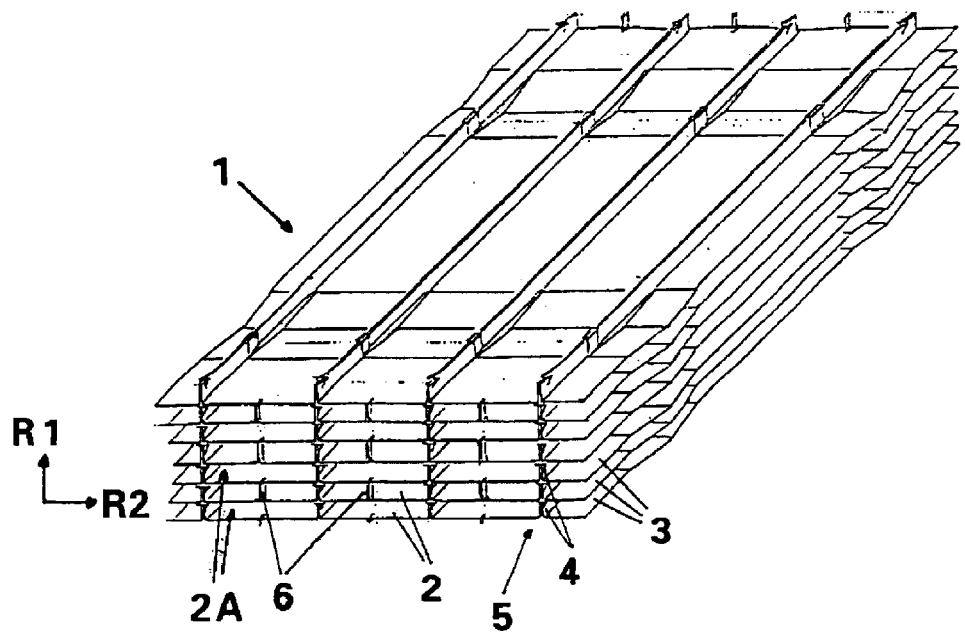
FIG. 1 shows a section of a honeycomb with rectangular flow ducts.

FIG. 1 shows a section of a honeycomb 1 with rectangular flow ducts 2, whose height-to-width ratio is approximately 5:1. The ducts thus display a substantially different cross-sectional dimension in the two directions R1 and R2, which are perpendicular to one other. The individual foil layers 3, which are arranged in congruent fashion relative to each other, display fold webs 4, whose height is slightly greater than the height of ducts 2 and which each engage the fold web of the foil layer above, this producing double-walled partition walls 5, which extend over the height of the honeycomb and simultaneously form the lateral borders of flow ducts 2a. The distance between the individual walls is small, meaning that, for example, coating material cannot enter the space between the walls during its application and also that the reduction of the cross-section by the double-walled partition wall is kept to a minimum.

Honeycomb 1 is formed by a foil strip laid in zigzag fashion, where sections are punched out in the fold areas of the foil strip. Webs 6 are left between the punched-out sections, these interconnecting the individual foil layers 3 forming ducts 2A and at the same time being provided with lateral fold-in tabs which stabilise the fold areas.

Figure 2:
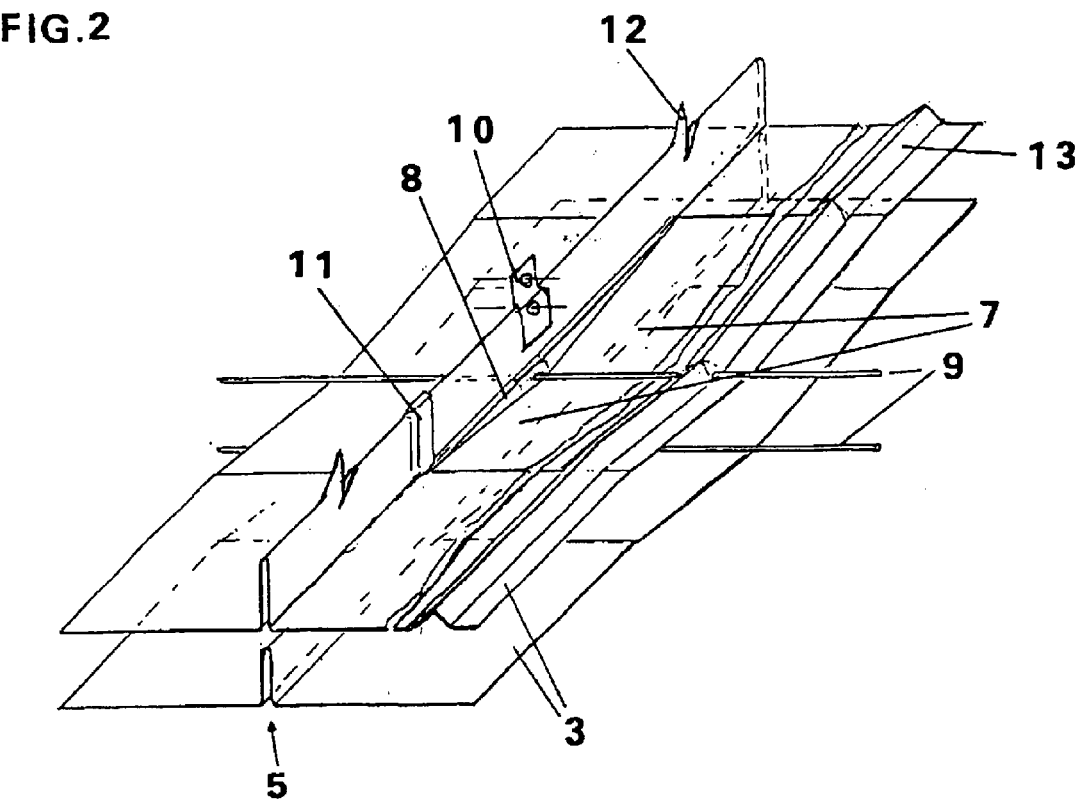
FIG. 2 illustrates the configuration of the flow ducts.

As can be seen in detail in FIG. 2, the flow ducts display downward-bent sections 7 adjacent to partition walls 5, which produce gap 8 by compressing foil layers 3 in the longitudinal direction of the honeycomb and shortening partition wall 5 by means of folds 11. In this way, stiffening wires 9 can be woven in transverse to the flow ducts between two adjacent foil layers 3. In this context, wires 9 penetrate partition walls 5, meaning that the adjacent foil layers 3 are fixed to one another in positive fashion. A notched tab 10 is provided at the point where wires 9 penetrate partition wall 5, engaging and being trapped in partition wall 5 above it.

Furthermore, fold webs 4, which make up partition walls 5, are provided with projections 12 by means of making cuts. The projections are likewise trapped in the respective fold web 4 located above them in order to create a stable partition wall 5.

In order to stabilise flow ducts 2, foil layers 3 within them are provided with fold ribs 13, running in the longitudinal direction, which prevent sagging of foil layers 3 in the middle area of ducts 2.

Figure 3:
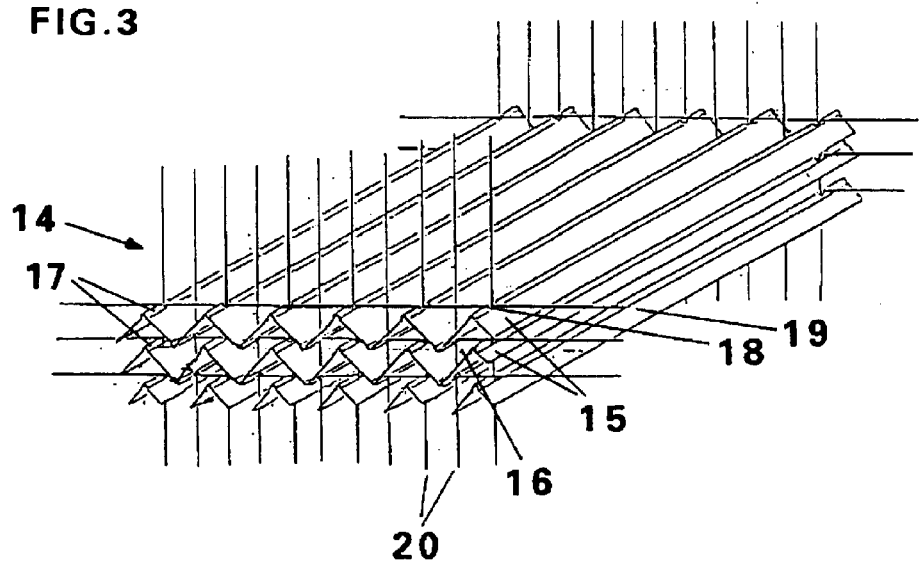
FIG. 3 shows a section of another configuration of a honeycomb.

FIG. 3 shows a section of another configuration of honeycomb 14, which is constructed of foils 15 folded in zigzag form and laid in congruent fashion relative to each other. Flow ducts 16 bordered by adjacent foils thus also display a zigzag-shaped cross-section with plane-parallel side walls. The angles in the course of the gap are designed to be so obtuse that no excessively thick boundary layers form locally. The upper and lower fold lines of foils 15 are provided with stiffening longitudinal ribs 17, the height of which is small compared to the distance between foils. On the two opposite sides of foils 15, longitudinal ribs 17 display notches 18, into which stiffening wires 19 running parallel to the foils are inserted, or which support the foils at the position of the notches. Wires 19 are fixed to the housing (not shown) in a manner capable of absorbing tensile forces, thus defining the distance between foil layers. At the same time, wires 20, which run vertical to the foil layers, pass through the foil layers, which are connected to wires 19 in the area of the notches, e.g. using solder material or by twisting the wires.

Using the arrangement illustrated in FIG. 3, ducts extending over the entire width of honeycomb 14 can be formed.

Figure 4:
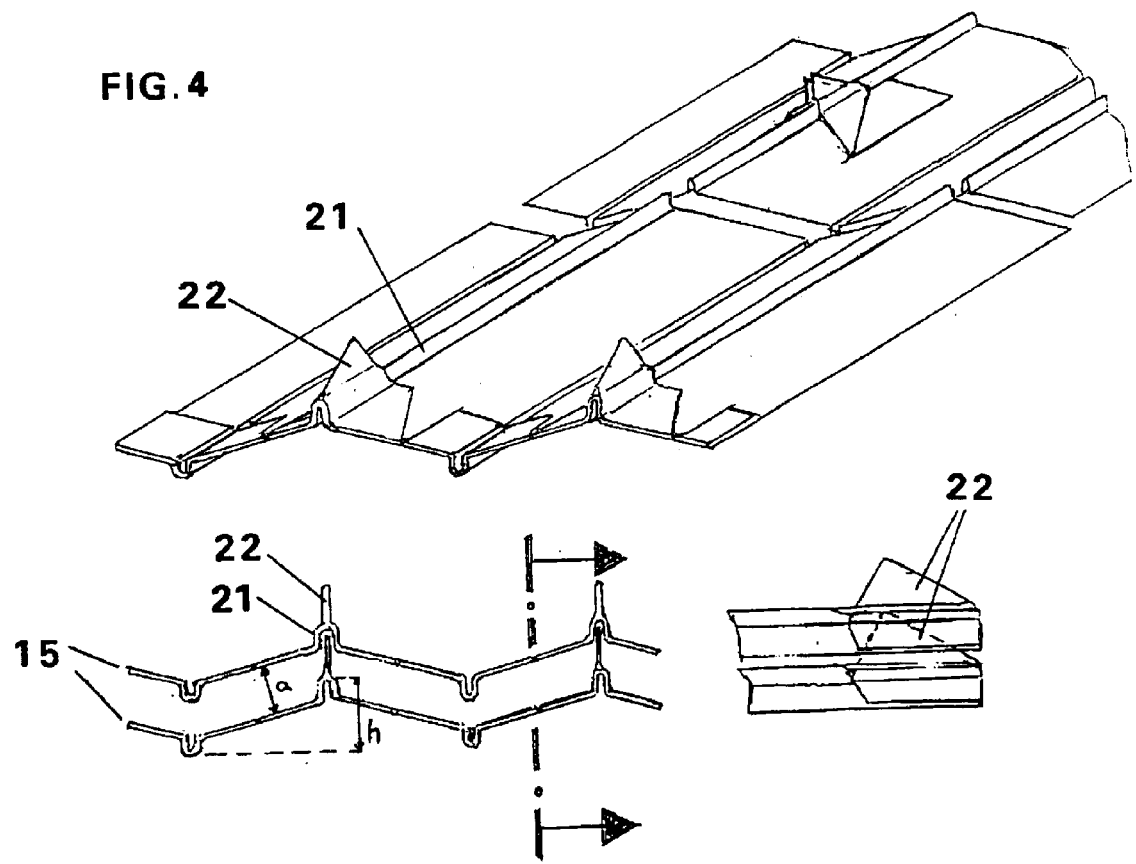
FIG. 4 illustrates connecting foils according to FIG. 3.

As shown in FIG. 4, in order to connect foils 15 according to FIG. 3, double-walled tabs 22 can be formed on both sides of fold ribs 21 by making cuts, these lying against each other and engaging and being trapped in the fold rib of foil layer 15 above them. Foil layers 15 thus have double-walled stiffening at the face end and are only fastened to each other at virtually one-dimensional connecting points. In addition to the local doubling of the walls and fastening tabs 22, foil layers 15 can also be stabilised by additional stiffening elements, e.g. by wires or strips, which can also be passed through tabs 22.

In the practical examples according to FIGS. 3 and 4, profile height h of foil layers 15 [a, b] essentially corresponds to distance a between the foil layers.

Figure 5:
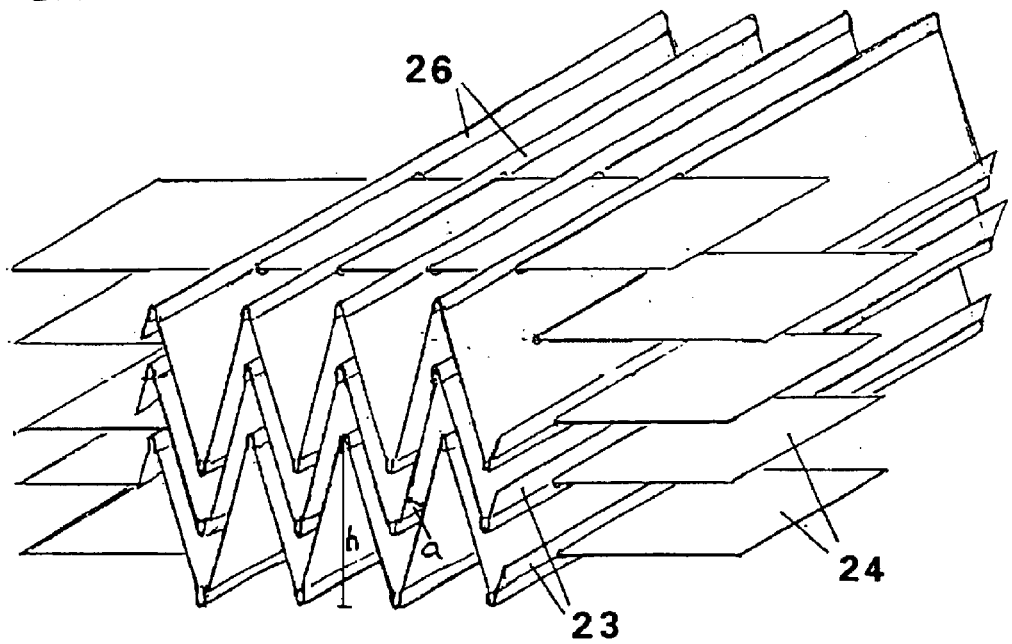
FIG. 5 is a schematic representation of another configuration of a honeycomb.

FIG. 5 shows a schematic representation of a further configuration, where profile height h of the foil layers is substantially greater than distance a between the foil layers. Moreover, stiffening elements are provided in the form of strips 24 whose principal plane is parallel to the foil layers. In this context, strips 24 pass through the foil layers immediately below or above fold ribs 26, which laterally border the fold webs, and in the middle of plane fold legs 25. In this case, fastening to foil layers 23 in a manner capable of absorbing tensile forces is achieved by coating with a catalyst material up to a thickness exceeding the diameter of the holes in the foils.

Figure 6:
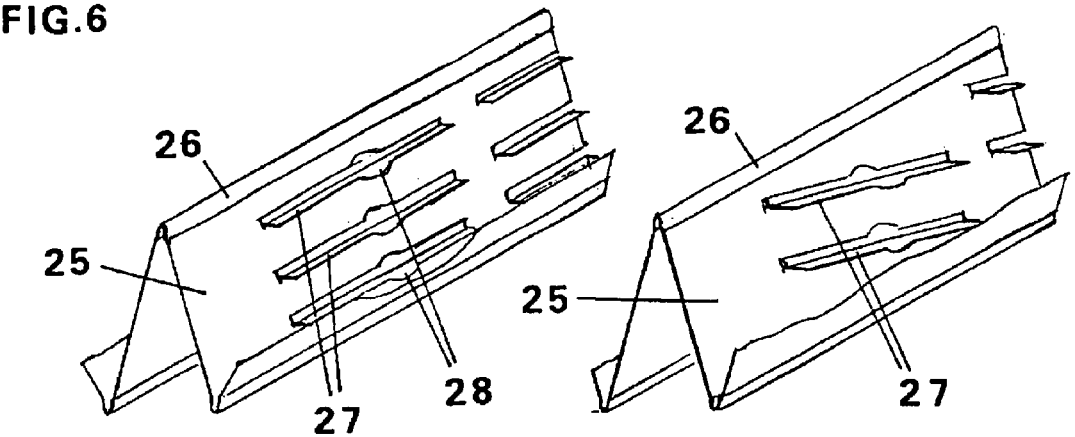
FIG. 6 illustrates fold webs of the foil layers of the honeycomb of FIG. 5.

As shown in FIG. 6, fold webs 25 of the foil layers according to FIG. 5 can be provided with notched webs 27, which extend in the longitudinal direction of the flow ducts and parallel to fold ribs 26, where the length of notched webs 27 is of the order of magnitude of the width of fold webs 25. In the practical example, the distance between notched webs 27 in the longitudinal direction of the flow ducts is shorter than the length of the notched webs. Notched webs 27 each display a projection 28 in the middle area, this serving as a rest against the laterally adjacent fold web of the foil layer above it.

As shown on the right in FIG. 6, notched webs 27 can also be inclined in relation to the longitudinal direction of the flow ducts, the notched webs enclosing an acute angle with the longitudinal direction of the ducts. Consecutive notched webs 27 in the longitudinal direction of fold webs 25 are arranged in alignment with each other.

Figure 7:
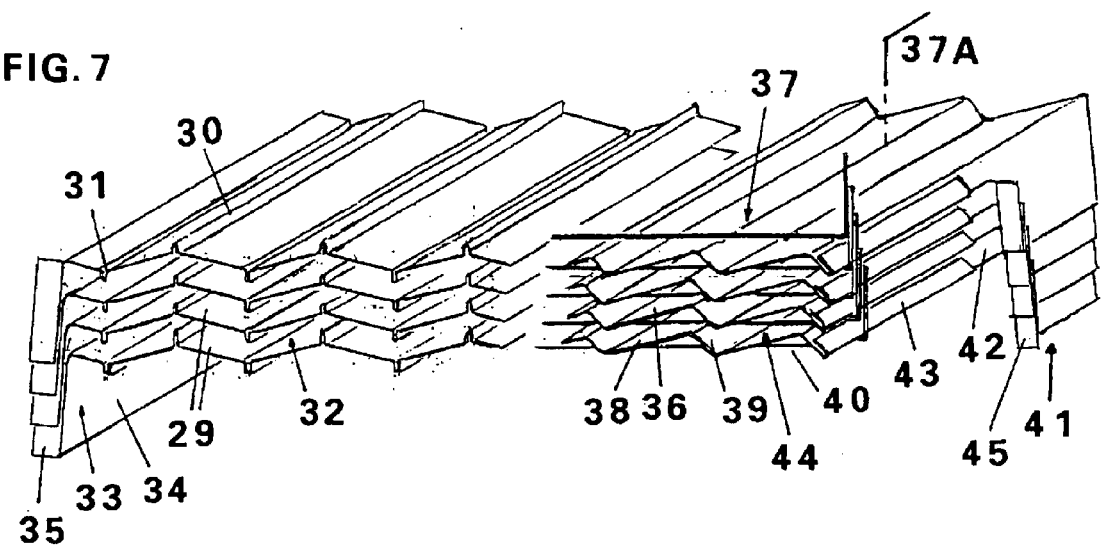
FIG. 7 shows two alternative configurations of a honeycomb area laterally bordering on a housing or on another honeycomb.

FIG. 7 shows two alternative configurations of the honeycomb area laterally bordering on a housing (not shown) or on another honeycomb.

According to the left-hand side of FIG. 7, the individual foil layers 29 are arranged in congruent fashion relative to each other and their upper and lower vertices are each provided with longitudinal ribs 30, 31, with the result that a flow duct 32 extending over the entire width of the honeycomb is formed. In order to fasten the individual foil layers to each other and to create side walls 33 which stabilise the honeycomb structure, foil layers 29 are provided with fold webs 34, which overlap each other, are bent through approximately 90° relative to the foil layers and fastened to each other by means of suitable jointing methods, such as welding methods or connecting wires. Foil sections 35, projecting laterally from the honeycomb, are integrally moulded on fold webs 34 and can be clamped in a bead of a housing (not shown) in order to fix the honeycomb on the housing. Corresponding to fold webs 34, it is also possible to provide corresponding folds inside the honeycomb in order to create partition walls that cut off the flow ducts.

The right-hand side of FIG. 7 shows a face-end section of a honeycomb in which foil layers 36 are designed asymmetrically in relation to a plane 37A, arranged perpendicular to the foil layers and running through vertex 37, in that fold webs 38, 39 are of different widths. In this context, the shorter fold webs 39 face the lateral outer surface of the honeycomb, although this can also alternatively be the case for the longer fold webs 38. The individual foil layers are supported by horizontally arranged stiffening wires 40, which rest on the respective foil layer located below them. Closed sidewall 41 is constructed in the manner illustrated on the left-hand side of FIG. 7.

In the inlet area of the honeycomb, lateral fold webs 42 are beaded to form stiffening ribs 43, so that lateral inflow of a medium into flow ducts 44 is possible. This design can also be realised regardless of whether the honeycomb structure is designed according to the invention.

In this context, wires 40 are bent upwards against stiffening ribs 43 at the outer edge, this preventing lateral displacement of the foil layer ends projecting via foil sections 45. Alternatively, wires 40 can also run in a straight line and be fastened to a housing on the sides. Wires 40 can also be at a distance from the foil layer below, this permitting adjustment of the height of flow ducts 44.

Figure 8:
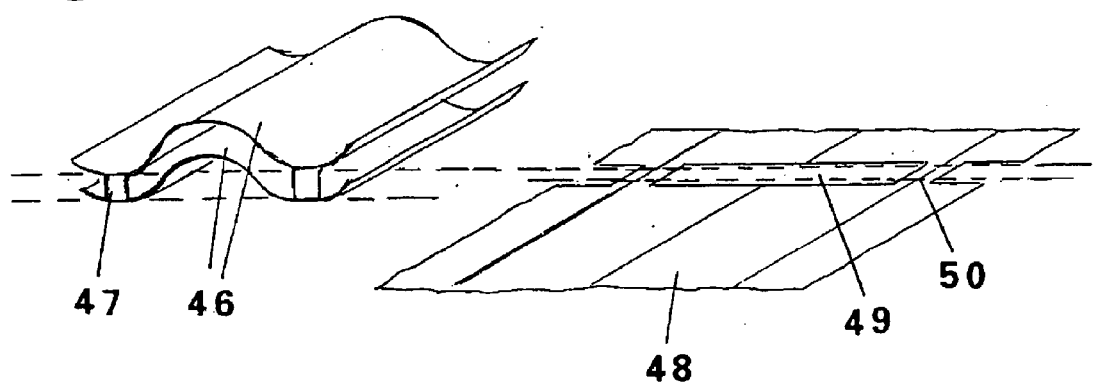
FIG. 8 is a section of a honeycomb with foil layers arranged in congruent fashion relative to each other.

FIG. 8 shows a section of a honeycomb with foil layers 46, which are arranged in congruent fashion relative to each other, have a wave-shaped profile and are interconnected via webs 47.

As shown on the right-hand side of FIG. 8, a honeycomb structure of this kind can be constructed by means of a foil strip 48 laid in meandering fashion, where punched holes 49 and fold lines 50 are made in the fold area of the foil strip. Compression of foil strip 48 in the transverse direction results in the structure with identically shaped foil layers 46 shown on the left-hand side of FIG. 8. The length of webs 47 permits corresponding adjustment of the distance between foil layers, the webs providing stabilisation at the points where forces of pressure are applied by the fluid.

Figure 9:
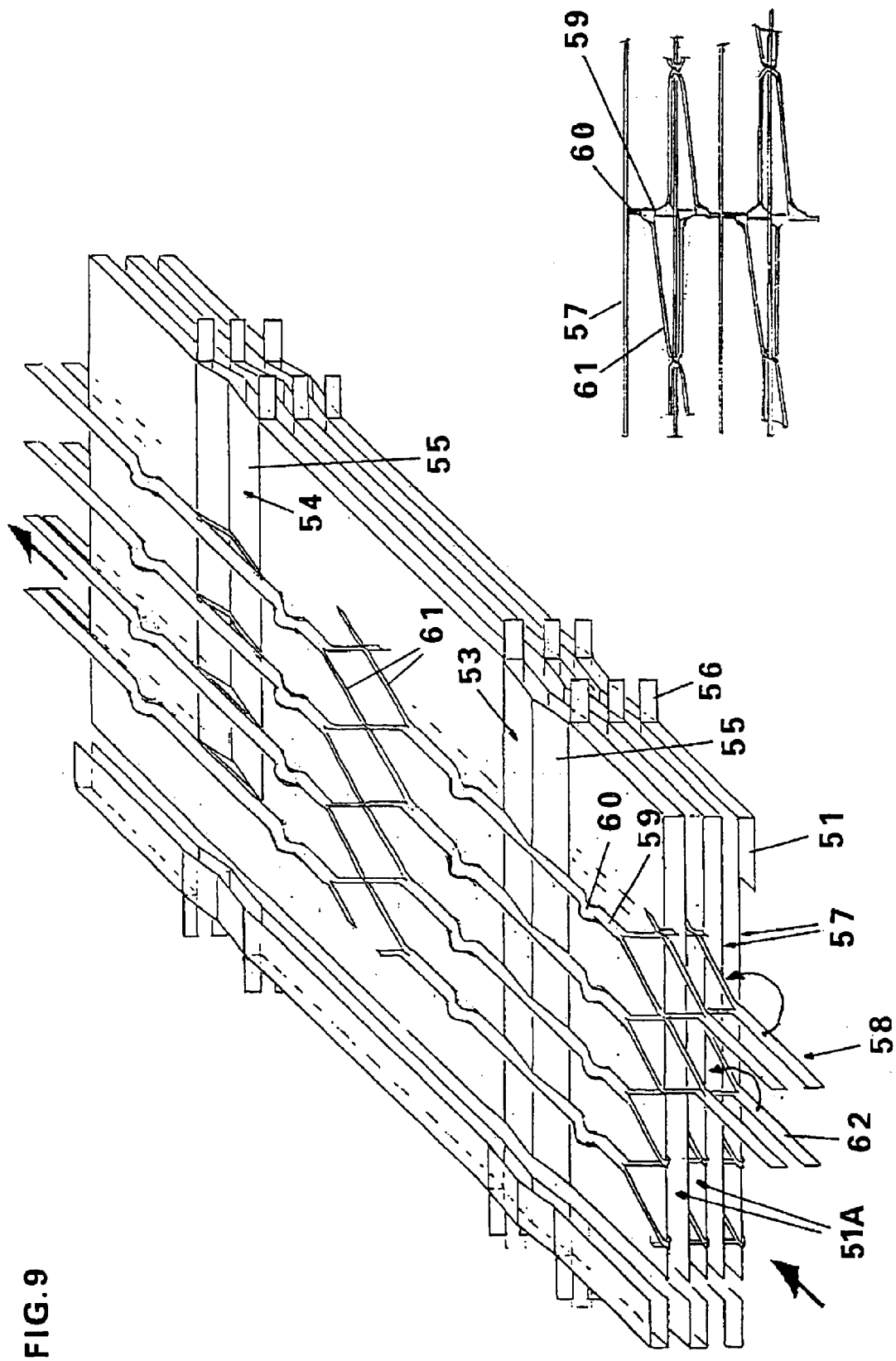
FIG. 9 is a section of a honeycomb having a foil strip laid on the honeycomb.

FIG. 9 shows a section of a honeycomb having a foil strip 51 laid in meandering fashion in the transverse direction of the honeycomb, together with an endless folded strip of expanded metal arranged transverse thereto, where this configuration and the further details can also be realised regardless of whether the honeycomb structure is designed according to the invention. In order to stabilise the folded, cross-over structure, each of the foil layers of the foil strip has two stiffening ribs, 53, 54, running transverse to the direction of flow indicated by the arrows, where the length of fold webs 55 is large in comparison with the distance between foil layers. In order to form upward and downward-pointing ribs 53 and 54, foil sections 56, located in the area of the fold, are notched laterally outwards and simultaneously serve to fasten the honeycomb to a housing (not shown).

Inserted between individual foil layers 57 are individual expanded-metal layers 58, the ends of which that protrude beyond foil layers 57 are folded around the respective foil layer ends and thus reach into the adjacent flow duct 51A. The layers of expanded metal serve both to support adjacent foil layers 57 against each other and to enlarge the active catalyst surface. Expanded-metal layers 58 display sections 59 which extend in the longitudinal direction of the flow ducts, rest on the foil layers at the face end and thus stand vertically on the foil layers and support the foil layer above them. Sections 59 are provided with lateral bulges 60 to increase the stiffness in the event of forces of pressure exerted vertically on the foil layers, as well as being guided free of play in vertical gaps by ribs 53. Foil sections 59 can also have areas of lower height, which can be arranged between bulges 60. Foil sections 59 are interconnected by intersecting connecting webs 61 that are integrally moulded together at the points of intersection and can be produced by making cuts in the foil layers, where fluid exchange transverse to the longitudinal direction of flow can also take place in these areas. The end areas of expanded-metal layers 58 are folded over in such a way that end sections 62 are perpendicular to the respective opposite foil layers 57 and rest on or support these. Instead of using individual expanded-metal layers, these can, like foil layers 57, also be joined to form an endless expanded-metal strip laid in meandering fashion.

Figure 10:
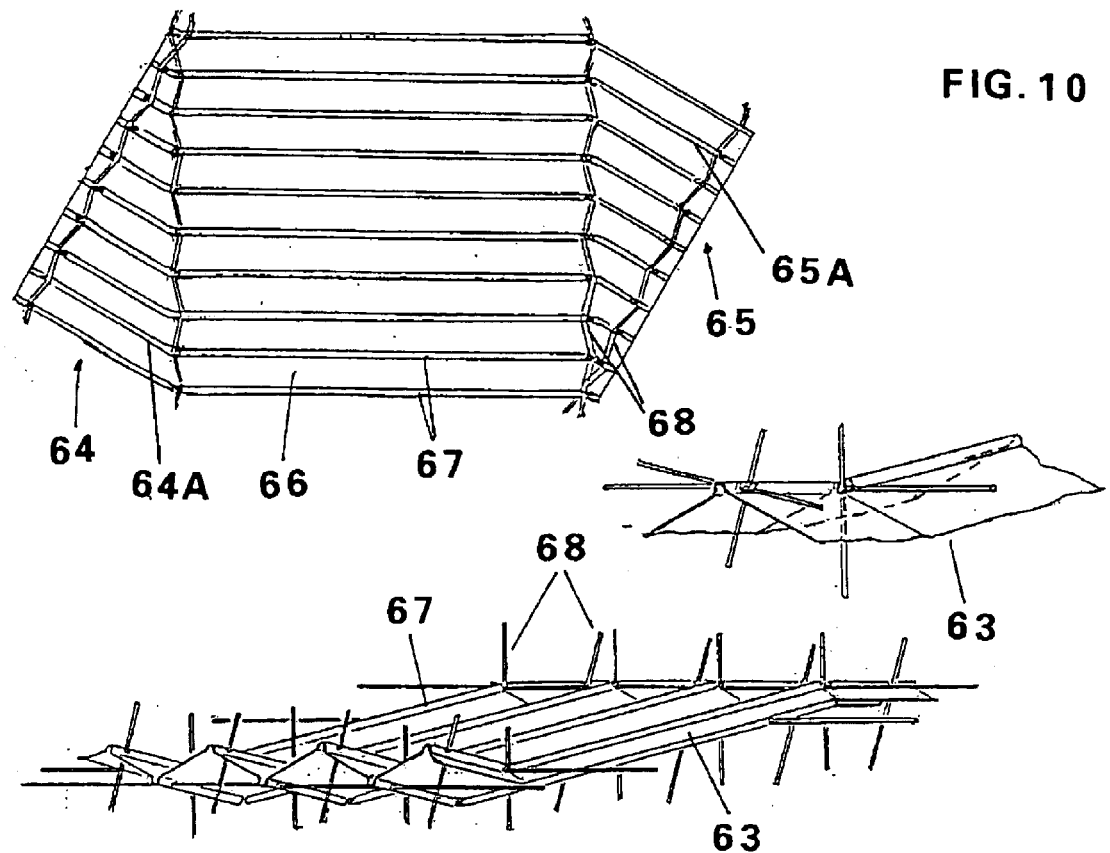
FIG. 10 shows an arrangement of foil layers corresponding to FIG. 3.

FIG. 10 shows an arrangement of foil layers corresponding to FIG. 3, where foil layer sections 64a, 65a of end areas 64, 65 are angled relative to middle areas 66, this being facilitated by making cuts in fold webs 67. The end areas of the honeycomb, and also the folds bordering middle areas 66, are each stabilised by wires 68 positioned vertically to foil layers 63. End sections 64, 65 form an inlet or outlet area of the honeycomb which facilitates inflow of a medium into the honeycomb at an angle relative to foil layers 63, thus reducing pressure losses in the inlet area of the honeycomb. This design can also be realised regardless of whether the honeycomb structure is designed according to the invention.

Figure 11:
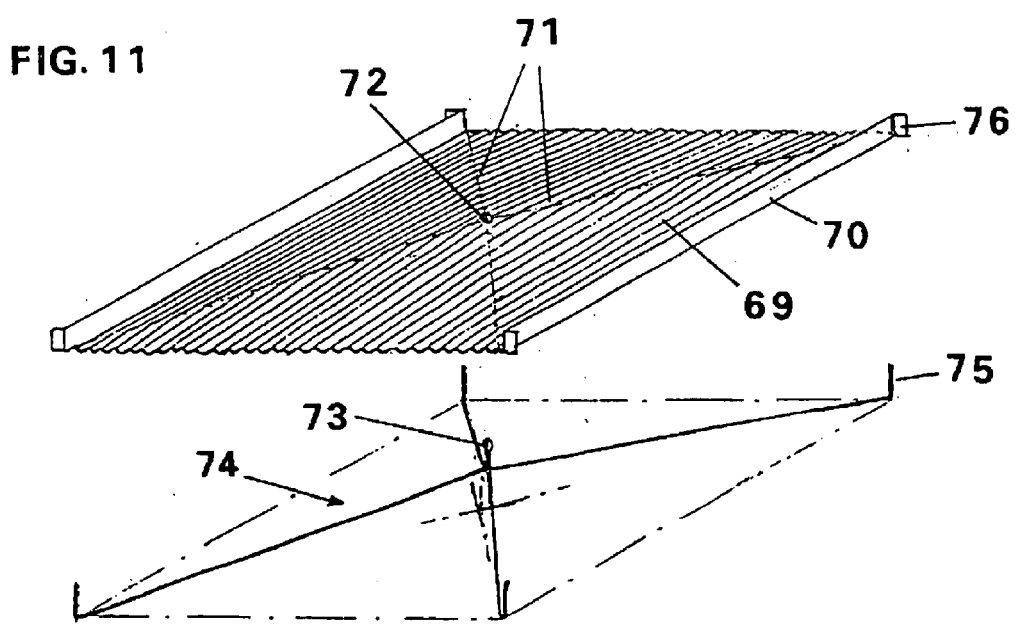
FIG. 11 shows a foil layer provided with a wave-shaped profile.

Foil layer 69 shown in FIG. 11 is provided with a wave-shaped profile and is laterally bordered by fold webs 70, by means of which side walls of the honeycomb can be constructed, as shown for fold webs 34 on the left-hand side of FIG. 7. Alternatively, this arrangement can also be realised with plain foil layers, or with alternating foil layers of plain and any structured design, where isometric duct cross-sections may also result. In addition to the wave-shaped profile, the profile height of which can be in the region of the distance between foil layers or less and which serves to stiffen the foil layers, foil layer 69 as a whole is deformed in pyramidal shape, as indicated by edges 71. To this end, the foil layer is provided with a central aperture 72, which is passed through by loop 73 of the wire arrangement located below the foil layer, which supports foil layer 69 in the honeycomb. Loop 73 can be connected to the corresponding loops of wire arrangement 74, arranged above or below, thus forming a continuous wire. Accordingly, angled wire ends 75 can be clamped in end sections 76 of fold webs 70, which are to be bent over, and connected to wire arrangements; 74 positioned above and below them. By applying tensile forces acting in opposite directions to loops 73 and wire ends 75, foil layers 69 can be deformed in pyramidal fashion along pre-stamped edges 71. The foil layers can be provided with additional foil layer folds and/or separate stiffening elements, a variety of possible applications arising as a result. Measures of this kind can be used to adjust the flow characteristics of a honeycomb, in which context it is obvious that the foil layers can also be deformed in manners other than the pyramidal fashion shown.

Figure 12:
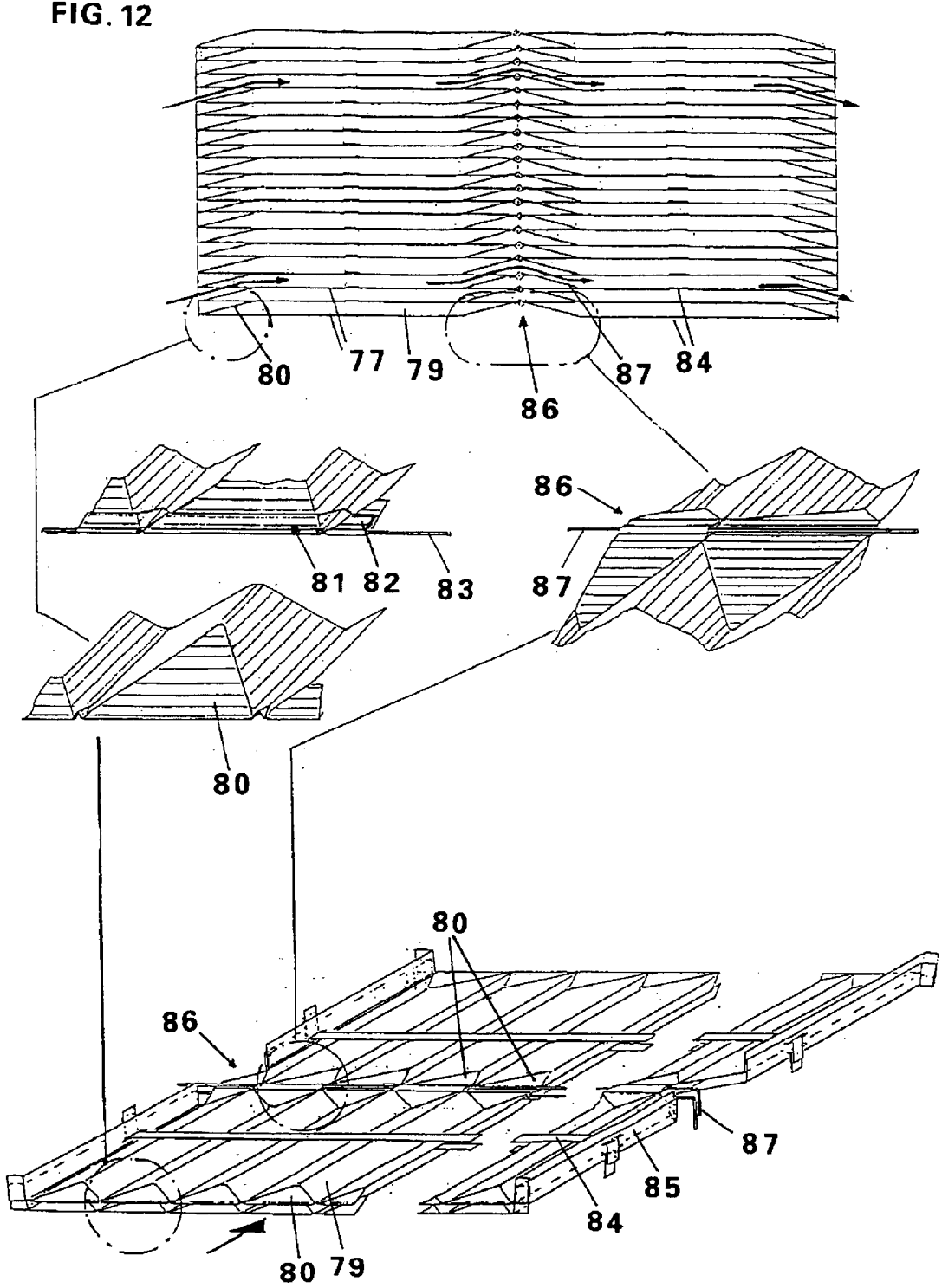
FIG. 12 shows a honeycomb structure made of individual foils.

FIG. 12 shows a honeycomb structure made up of individual foils or foil layers 77, which display zigzag folds and border flow ducts extending over the entire width of the foil layers. In order to facilitate inflow into the honeycomb at an angle to the principal plane of the foil layers, as indicated by the arrows, the ends of each of the triangular channels 79 are provided with a bevel 80, pointing towards the free end of the honeycomb, the cuboid shape of the honeycomb being retained. At the same time, bevels 80 also stabilise the inlet area of the honeycomb. This arrangement is also possible with isometric ducts.

Face-side end areas 81 of foil layers 77 can be beaded for stiffening, in which case additional stiffening wires 83, which are fixed to the housing (not shown) are trapped in bead 82. Additionally provided are strips 84, running transverse to foil layers 77, which rest on the top edges of channels 79 and support the foil layer located above them. In this context, narrow strips 84 pass through lateral fold webs 85 and are connected to each other and to the housing (not shown) in a manner capable of absorbing tensile stresses.

In the middle area of the honeycomb, the channel-like profile of foil layers 77 is interrupted by a flattened area 86, which extends over the entire width of the foil layer and is located at the height of the top edge of channel 79, and into which stiffening wires 87, which can be fastened to a housing, are woven. As a result of this fold, flow ducts 79 can be continued with a lateral and a vertical offset, as indicated by arrow AR, in the process of which the fluid guided in one duct section is automatically mixed with fluid guided in adjacent duct sections. The middle area of the honeycomb is additionally stabilised in this way, and better mixing of the flowing medium is also achieved at the same time.

The honeycomb according to FIG. 12 thus consists of several alternating, consecutively arranged, short mixing zones D with high form resistances, these zones also including the inlet and outlet areas, with reaction zones R arranged between them, in which the flow resistance is essentially determined by the action of frictional forces with the duct walls and/or catalyst carrier elements. The honeycomb shown in FIG. 13 also displays a corresponding zoned structure.

Figure 13:
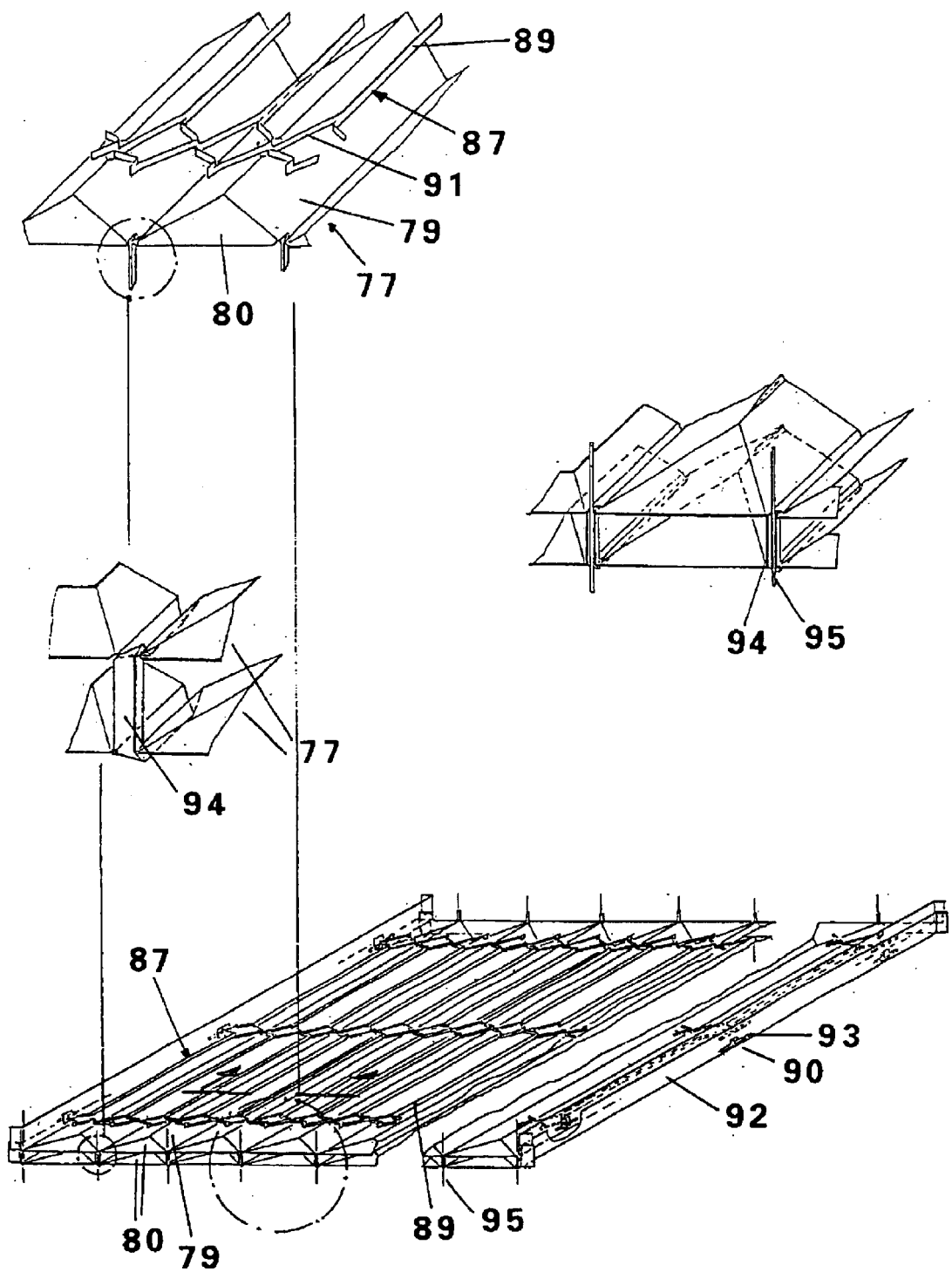
FIG. 13 shows expanded metal layers inserted between the individual foil layers.

As can be seen from FIG. 13, expanded-metal layers 87 can also be inserted between the individual foil layers 77, this permitting adjustment of the distance between foil layers as required. In this context, the one-piece expanded-metal layers display elongated sections 89, in the form of narrow strips located perpendicular to the principal planes of the foil layers, and connecting webs 91, connected to each other via points of intersection. At individual points 90, the expanded-metal layers can in this context pass through the lateral fold webs 92 of the foil layers that are joined to form an outer wall, and be fastened to these by beading ends 93, for example. Corresponding to the foil strip, the expanded-metal layers can also be designed as a strip laid in meandering fashion. Elongated sections 89, around which flow is possible, decisively improve diffusion and thus the conversion of pollutants in the ducts.

The honeycomb is produced from an endless foil strip laid in meandering fashion in accordance with FIG. 7, where webs 94 connecting foil layers 77 are folded in V-shape and stiffening wires 95, running perpendicular to foil layers 77, are clamped in the fold.

Figure 14:
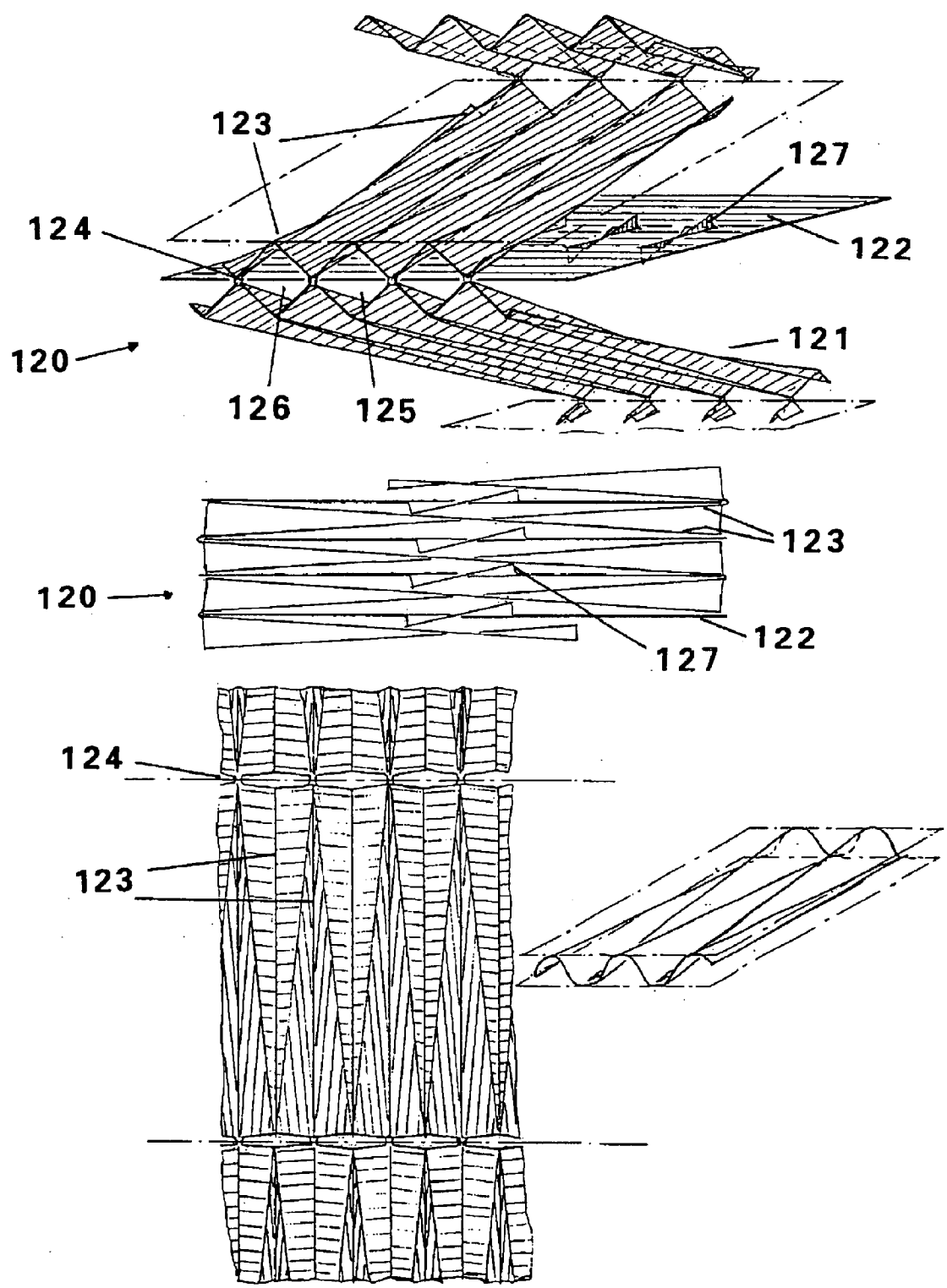
FIG. 14 shows a honeycomb structure with a foil strip laid in meandering fashion.

FIG. 14 shows a honeycomb structure with a foil strip 120 laid in meandering fashion where individual plane foils 122 are inserted between the individual foil layers 121 with a wave-like structure. Vertices 123 of the individual foil corrugations run at an angle relative to plane foil layers 121 (see FIG. 14, bottom), where the gradients of adjacent vertices of a foil layer alternate with the result that the height of the flow ducts constantly increases or decreases along a flow path. The side walls of the flow ducts thus run both at an angle to the transverse direction and at an angle to the longitudinal direction of the longitudinal direction of the honeycomb. As only the face ends, i.e. deflection areas 124, of corrugated foils 121 rest on plane foil layers 122, unobstructed transverse exchange of the fluid and flow around the edges are possible a distance away from the face ends, the height of the lateral openings of adjacent ducts 125, 126 being greatest half way along the honeycomb. Thus, as a result of the continuously changing duct geometry, a volume segment entering a duct 125 is simultaneously compressed and expanded in different directions, automatically being transferred to an adjacent duct 126 in this process and mixed with the fluid present there, meaning that it flows out of the honeycomb with a lateral offset. Moreover, the fact that flow is possible around the edges of the foil folds means that stagnating fluid volumes are avoided, as are boundary layers which adhere to the foils and are thus comparatively thick.

For stabilisation purposes, plane foil layers 122 are provided with erected notched tabs 127, which support the corrugated foil layers and, at the same time, lead to an exchange of fluid from above the below the plane foil layers due to the change in the duct cross-sections.

Needless to say, other profiles and/or baffles are also capable of achieving large-area, compulsory mixing of fluid volumes entering the honeycomb in adjacent fashion, e.g. in adjacent ducts. In the practical example, the compulsory deflection of the fluid flow in adjacent ducts or honeycomb sections takes place simultaneously in opposite, approaching directions, in which process virtually no pressure losses and stagnating fluid accumulations occur owing to the continuously changing duct cross-sections.

Figure 15:
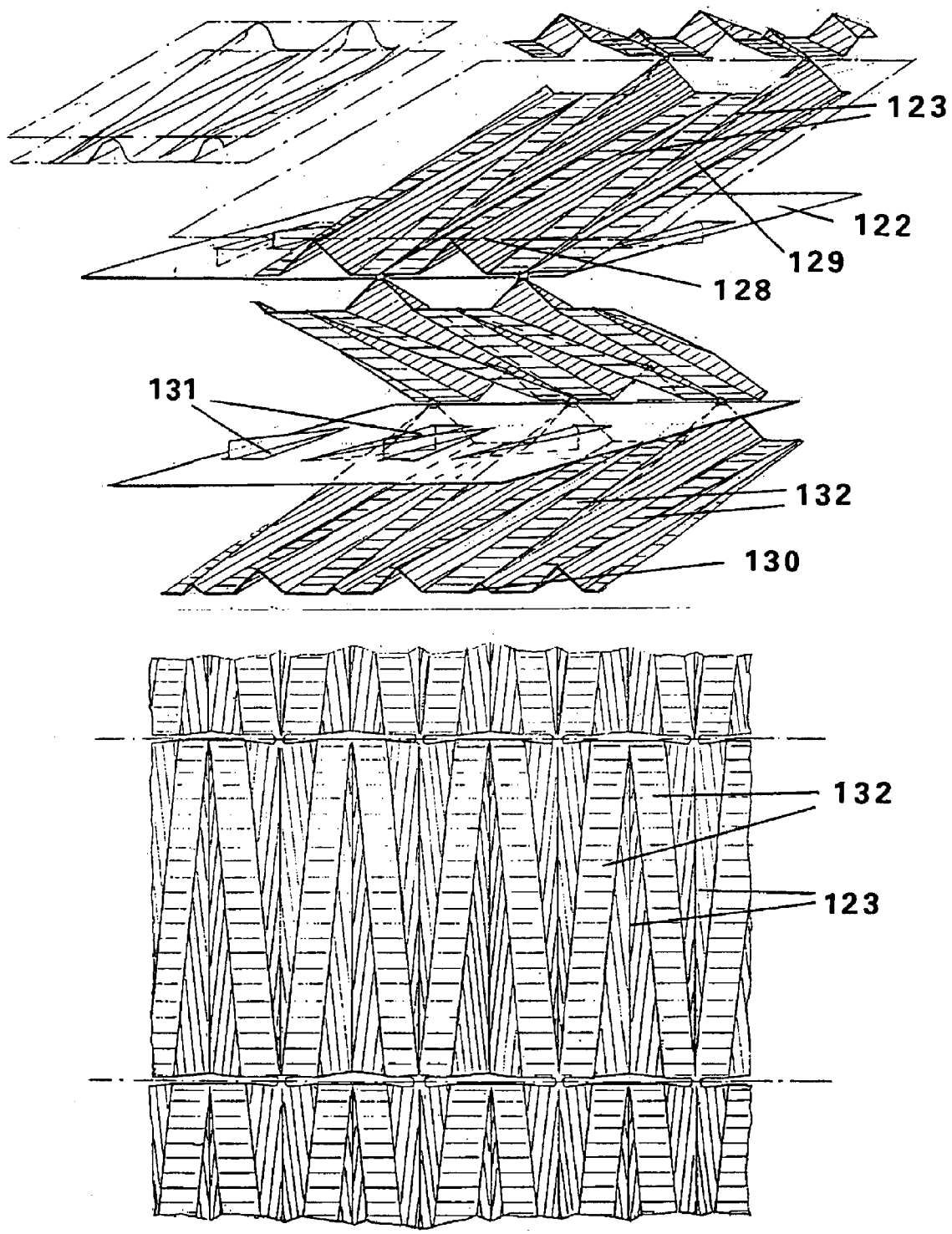
FIG. 15 shows a variant of the honeycomb structure of FIG. 14.

FIG. 15 shows a variant of a honeycomb according to FIG. 14 (identical elements are indicated by identical reference numbers), in which, between ducts 128, 129, which narrow and widen in the direction of flow, plane foil sections 132 are provided, which rest on plane foil layers 122, thereby producing stiffening doubling of the layers. At their ends 130, the ducts are also open with small cross-sections at their face ends. As the plane foil sections would prevent fluid exchange transverse to the direction of flow, compulsory lateral deflection of the fluid through the plane foil layers is achieved through apertures 131 of appropriately large size (only illustrated schematically), the dimensions of which are selected here in such a way that they do not result in any pressure losses. The mixing of adjacent fluid volumes is thus achieved by means of a continuous change in the duct cross-sections and merging or separation of the duct areas, the realisation of which is not dependent on the honeycomb being designed according to the invention.

As illustrated in FIGS. 14 and 15, the foil corrugations can be of either angular or curved design.

Figure 16:
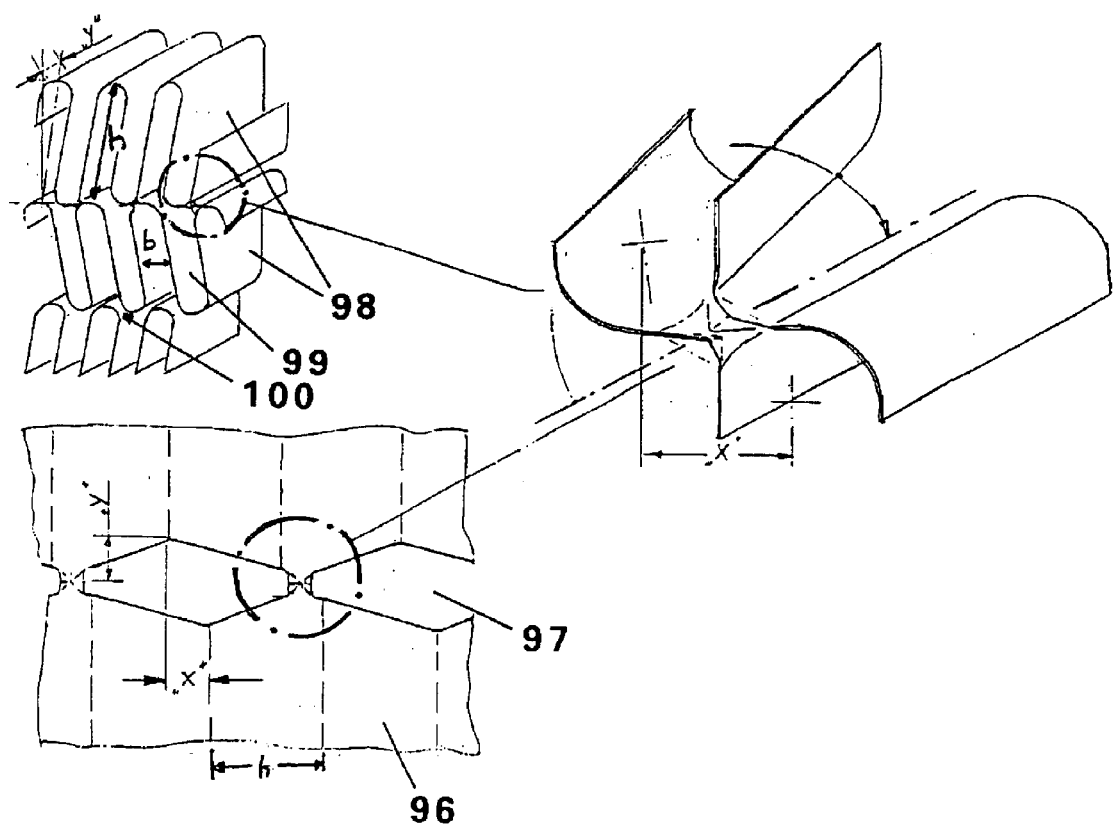
FIG. 16 illustrates designs of cut-outs made in elongated foil strips.

According to FIG. 16, an asymmetrical design of cut-outs 97, made in elongated foil strip 96 to be laid in meandering fashion, can be used to achieve lateral staggering of the corresponding foil layers 98 relative to each other. In this context, the offset can correspond to the width of a flow duct 99, which is advantageously only narrow in this case, with the result that the flow ducts of adjacent foil layers are virtually isolated from each other or, as illustrated in the Figure, to a fraction of the width b of flow ducts 99, with the result that these communicate via narrow point 100 and stagnating gas is flushed away here. The cut-outs can also be designed such that the foil layers engage each other and rest laterally on the duct walls, this making it possible to produce closed ducts with any desired cross-section. In all, a stable honeycomb can be simply constructed here by way of the remaining webs.

To this end, cut-outs 97 are of parallelogram shape, so that the offset x of the fold lines running along foil strip 96 corresponds to the lateral offset of the flow ducts. The half-length y of cut-outs 97 determines the inclination of the face ends of the inlet areas, while dimension h determines the height of the flow ducts. The comparatively great height h stiffens profiled foil layers 98 particularly, advantageously with a high section modulus, this resulting in great vibrational stiffness of the layers, which is particularly important if, in order to simplify manufacture, the layers are only connected at the face ends of the fold webs and need to be particularly resistant to bending in between.

The bottom of FIG. 17 shows a schematic representation of a honeycomb 110 which is constructed of foil layers 123 at a distance from each other, so that the flow ducts in the honeycomb and in the inlet area extend over the entire width of the honeycomb. The ducts in the inlet area and in the honeycomb can also display different cross-sections and extend over only part of the width of the honeycomb, where the ducts of the honeycomb, in particular, can also be of isometric design, e.g. with a exagonal or sinusoidal cross-section. The main part H of the honeycomb is bordered by more or less gas-tight side walls made up by lateral fold webs 111 of the foil layers. In this context, housing G according to the top of FIG. 17 can be in close contact with the fold 11 webs in order to support the side walls. In inlet area E of the honeycomb, the arrangement of which can be advantageous regardless of the duct design of the downstream honeycomb area, the housing is at a lateral distance from the foil layers 123 and the flow ducts are laterally open on both sides as a result of beading or removal of the fold webs, as illustrated at the top of FIG. 17, in which context the flow ducts in the inlet and/or outlet area can also extend over only part of the substrate width and flow ducts open on one side can also be provided. As indicated by the flow arrows, a medium can enter the U-shaped openings of flow ducts S both frontally and laterally, this greatly improving the area E of efficiency of a corresponding catalytic converter.

As indicated at the top of FIG. 17, a second honeycomb, located downstream of the first honeycomb, can have a different orientation of the foil layers of which it consists, such that, according to the practical example, the foil layers of the two honeycombs are offset through an angle of 90° relative to each other. In order to enable homogenisation of the medium, the honeycombs are separated from each other in the longitudinal direction by intermediate area Z.

For various applications, it may correspondingly also be advantageous in the event of angled inflow into the honeycomb, as is the case with the inlet pipe as per FIG. 17, for example, to arrange the foil layers of the first honeycomb in the direction of inflow in such a way that inflow takes place parallel to, and not at an angle to, the foil layers, as would be the case with an arrangement as per the second honeycomb 112 at the top of FIG. 17 with foil layers 120. The foil layers within the honeycomb can then be arranged as a continuation of the foil layers of the inlet area, possibly also in the form of separate foil sections. This prevents turbulence developing at the face edges of the foil layers, resulting in more favourable flow conditions.

What is claimed is:

1. A honeycomb having a honeycomb structure comprising a large number of ducts running through the longitudinal direction of the honeycomb, through which fluid can flow, where the honeycomb possesses foil layers arranged one above the other that border the ducts;

wherein the ducts are non-isogonal ducts which display a cross-sectional dimension a first direction (R1) that is several times the cross-sectional dimension in another direction (R2);

wherein the honeycomb structure is made up of individual foils which display zigzag folds providing individual triangular channels; and a. wherein at least one face end of the honeycomb the ends of each of the triangular channels are provided with a bevel pointing towards a free end of the honeycomb providing foil sections running at an angle relative to a longitudinal direction of the flow ducts; or b. wherein the foil layers are provided with foil webs extending in the longitudinal direction of the honeycomb having cuts extending transverse to the longitudinal direction of the honeycomb;

wherein foil sections are generated at least at one end area of the honeycomb extending from a face end of the honeycomb to the cuts; and wherein the foil sections of at least one end area of the honeycomb are angled with respect to a middle area of the honeycomb providing ducts being angled with respect to the longitudinal direction of the honeycomb.

2. The honeycomb according to claim 1, wherein the non-isogonal ducts extend over the entire length and over the entire width of the honeycomb and wherein the honeycomb consists of foil layers with identical profile that are arranged congruently or inversely in relation to each other.

3. The honeycomb according to claim 1, wherein the foil layers (36) have a profile which is asymmetrical relative to a plane (37*a*) running through one vertex (37) of the profile, perpendicular to the principal plane of the foil layer (36).

4. The honeycomb according to claim 1, wherein a plurality of stiffening elements (19, 20, 59) are arranged so as to act on each other directly or via connectors (61) separate from the foil layers.

5. The honeycomb according to claim 1, wherein all of the ducts of the honeycomb are designed as ducts which extend over the entire length of the honeycomb and over the entire width of the honeycomb with no lowering or only with lowering being less than 25% of the duct height.

6. The honeycomb according to claim 1, wherein the foils are laid in meandering fashion having webs connecting adjacent layers of the foils, and wherein all of the ducts of the honeycomb are designed as ducts extending over the entire length of the honeycomb and over the entire width of the honeycomb with no lowering or only with lowering being less than 25% of the duct height, despite the webs' connecting adjacent layers.

7. The honeycomb according to claim 1, a. wherein the foils are laid in meandering fashion the transverse direction of the honeycomb; or b. wherein fold areas are provided and wherein two-dimensional sections are punched out in the fold areas of the foils and webs are left between the punched-out sections.

\* \* \* \* \*